United States Patent [19]
Nakajima

[11] Patent Number: 4,466,726
[45] Date of Patent: Aug. 21, 1984

[54] IN-FOCUS INDICATOR FOR A CAMERA

[75] Inventor: Yukio Nakajima, Kanagawa, Japan

[73] Assignee: Olympus Optical Co., Ltd., Tokyo, Japan

[21] Appl. No.: 369,178

[22] Filed: Apr. 16, 1982

[30] Foreign Application Priority Data

May 20, 1981 [JP] Japan .................................. 56-76355

[51] Int. Cl.³ .............................................. G03B 3/00
[52] U.S. Cl. .................................... 354/409; 354/406
[58] Field of Search ............... 354/25, 60 E, 289, 409, 354/406

[56] References Cited
U.S. PATENT DOCUMENTS 4,361,390 11/1982 Yamada ............................ 354/25 X

FOREIGN PATENT DOCUMENTS 52-33527 3/1977 Japan .

Primary Examiner—Michael L. Gellner
Attorney, Agent, or Firm—Louis Weinstein

[57] ABSTRACT

An in-focus indicator for a camera includes a focussing condition detector which is adapted to produce a forward focussing signal and a backward focussing signal. An RS-flipflop forms a set signal save circuit which is set at an in-focus position where a switching occurs between the levels of the forward focussing signal and backward focussing signal. When the save circuit is set, an element is activated for a given time interval to produce sound. The detector is also adapted to produce an in-focus zone signal, and the set signal save circuit is reset when the level of the in-focus zone signal changes in response to a movement of the focal point out of the in-focus zone.

11 Claims, 4 Drawing Figures

IN-FOCUS INDICATOR FOR A CAMERA

BACKGROUND OF THE INVENTION

The invention relates to an in-focus indicator for a camera, and more particularly, to such an indicator for use in a camera having a detector circuit capable of detecting a forward or backward focussing or an in-focus condition of the camera and in which the achievement of an in-focus position is audibly indicated.

The present inventor has previously proposed an in-focus indicator in which status signals of different levels are produced for a forward and a backward focussing of a taking lens so that an in-focus condition is annunciated in terms of sound and light when a switching between the levels of the both signals occurs (see Pending Japanese Patent Application No. 42,715/1981). Resort to the auditory sense, in addition to the vision, by providing an element capable of producing sound upon reaching an in-focus condition, is very effective in view of a focussing operation during which a photographer concentrates his attention to a principle object being photographed which is visible through a finder. However, the indicator suffers from the difficulty that the sound produced, indicating an in-focus condition, each time the camera moves through the in-focus point either forwardly or rearwardly as a result of a hand shake after the taking lens has once been adjusted to the in-focus position is annoying to a photographer himself as well as to adjacent personnel, and also renders a person being photographed to be too aware to permit a photograph in a natural condition from being taken.

On the other hand, it will be appreciated a slight degree of forward or backward focussing does not present a problem whatsoever so far as the practice of a taking picture is concerned, and a sharp photograph can be taken within a limited in-focus zone. Hence, it will be seen that when the sound is utilized to notify the in-focus position, it is desirable that the number of times the sound is produced be minimized by preventing the sound from being produced if the focal point moves across the in-focus position as long as the point is within an in-focus zone, after the in-focus position is once reached to permit the element to produce sound for a given time interval.

SUMMARY OF THE INVENTION

In view of the foregoing, it is an object of the invention to provide an in-focus indicator for a camera in which a set signal save circuit is enabled to activate an element which produces sound at an in-focus position, which is manifest as a switching point between a forward and a backward focussing signal, and in which the save circuit is prevented from being reset to thereby prevent another activation of the element as the in-focus position is subsequently passed, as long as an in-focus zone signal is maintained.

In accordance with the invention, an in-focus condition is notified in an audible manner. Hence, it is unnecessary that a photographer to look aside from the image of an object being photographed which is formed within a finder, thus facilitating a reliable focussing operation. Since the element produces sound only when the focal point of the taking lens moves from outside the in-focus zone into the in-focus position, and since another activation of the element is prevented as the focal point moves through the in-focus position if the focal point returns inside the in-focus zone within a short time interval after it has gone out of the zone, the number of times the element is activated to produce sound can be minimized.

DESCRIPTION OF PREFERRED EMBODIMENTS

Figure 1:
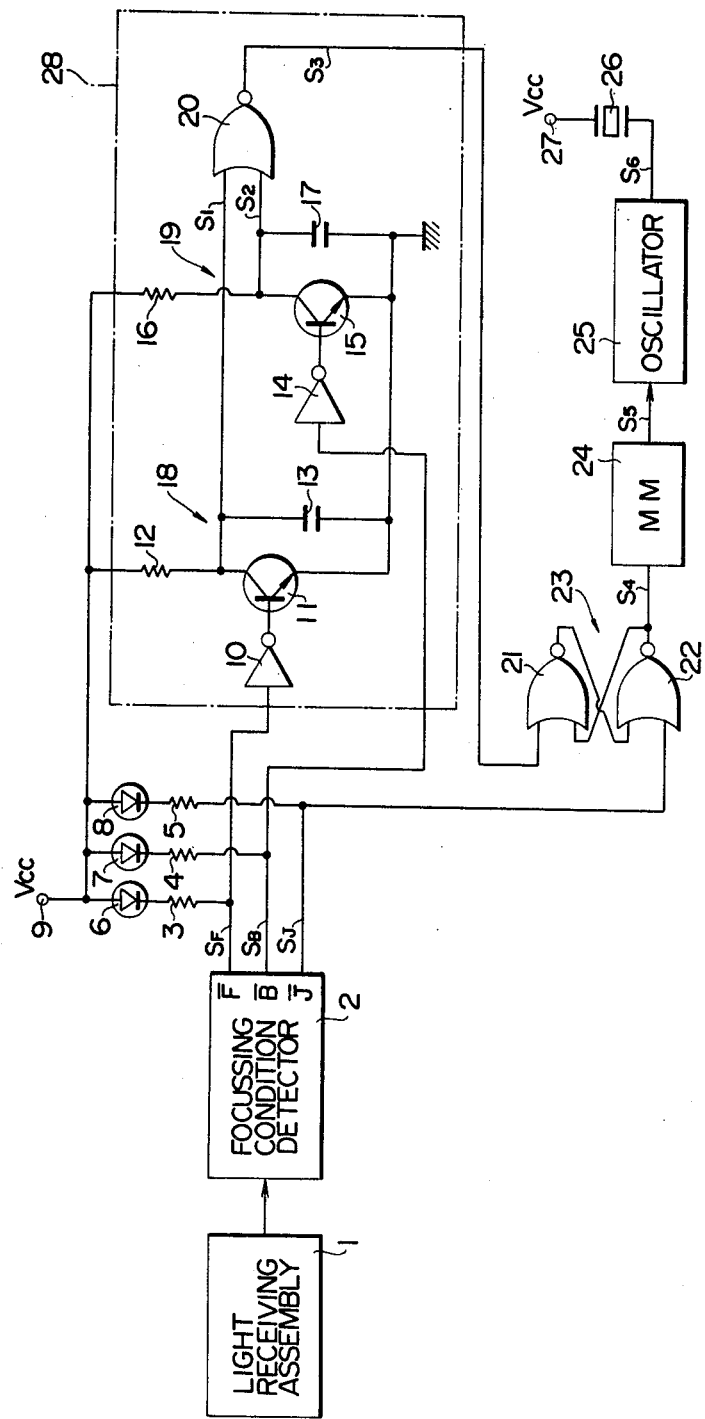
FIG. 1 is a circuit diagram of an in-focus indicator according to one embodiment of the invention.

FIG. 1 is a circuit diagram of an in-focus indicator according to one embodiment of the invention. The indicator includes light receiving assembly 1 including a substrate having an array of photoelectric transducer elements or a number of other photoelectric transducer elements such as charge coupled devices thereon. The transducer outputs are fed to an in-focus detector 2. The detector 2 operates to detect a focussing condition in response to output signals from the assembly 1. The detector has output terminals F, B, J, each of which produces a different status signal SF, SB, SJ, respectively. The status signals SF, SB, SJ represent a forward focussing signal, a backward focussing signal and an in-focus zone signal, respectively. It is to be understood that each of these status signals assumes a low level (hereafter referred to as "L") whenever the taking lens of the camera assumes a forward focussed, a backward focussed condition or an in-focus zone, respectively, and assumes a high level (hereafter referred to as "H") otherwise. The output terminals F, B, J of the detector 2 are connected through individual resistors 3, 4, 5 to the cathode of light emitting diodes 6, 7, 8, respectively, which represents light emitting, display elements of the indicator. The anodes of the diodes 6 to 8 are connected in common and connected to a terminal 9, to which a supply voltage Vcc is applied.

The output terminal F of the detector 2 is also connected through an inverter 10 to the base of an NPN transistor 11, the collector of which is connected to the terminal 9 through a resistor 12 and the emitter of which is connected to the ground. A capacitor 13 is connected across the collector and emitter of the transistor 11. The output terminal B of the detector 2 is connected through an inverter 14 to the base of an NPN transistor 15, which has its collector connected through a resistor 16 to the terminal 9 and its emitter connected to the ground. A capacitor 17 is connected across the collector and emitter of the transistor 15. The circuit formed by the transistor 11, resistor 12 and capacitor 13 as well as the circuit formed by the transistor 15, resistor 16 and capacitor 17 form pulse leading end delay circuits 18, 19 having predetermined RC time constants. The collector of each of the transistors 11, 15, which represents the output of the delay circuits 18, 19, is connected to one input each of NOR gate 20. The combination of delay circuits 18, 19 and gate 20 forms a set signal generator 28 which feeds a set signal to an RS-flipflop 23 to be described below.

Specifically, the flipflop (hereafter abbreviated as RS-FF) comprises a pair of NOR gates 21, 22 having their one input connected to the output of the other gate. The output terminal of the gate 20 is connected to one input of gate 21, which represents a set input terminal. The flipflop 23 forms a set signal save circuit which saves the set signal from the set signal generator 28. RS-FF 23 also includes a reset input terminal which is connected to the output terminal J of the detector 2. RS-FF 23 has an output terminal, formed by the output terminal of the gate 22, which is connected to a monostable multivibrator 24 of a well known form. The output terminal of the multivibrator 24 is connected to an oscillator 25 of a known form. A sound producing element 26 such as a ceramic piezoelectric element is connected between the output terminal of the oscillator 25 and a terminal 27, to which the supply voltage Vcc is applied.

The operation of the in-focus indicator thus constructed will be described with reference to the timing charts shown in FIG. 2. As illustrated, at time $t_0$, the taking lens assumes a forwardly focussed position, which is out of the in-focus zone. Accordingly, the status signals SF, SB, SJ assume "L", "H" and "H" levels, respectively. Consequently, there occurs a current flow through the diode 6 to illuminate it, thus indicating the forward focussing condition by the emission of light therefrom. The forward focussing signal SF which assumes the "L" level is fed through the inverter 10 to turn the transistor 11 on, the collector of which then assumes "L" level, supplying an "L" level signal to one input $S_1$ of the gate 20. Since the backward focussing signal SB assumes an "H" level, the transistor 15 remains off, the collector of which has a potential equal to the voltage across the capacitor 17, thus feeding an "H" level signal to the other input $S_2$ of the gate 20. Thus, the gate 20 produces an output signal $S_3$ of an "L" level, which is supplied to the set input terminal of RS-FF 23.

Since the in-focus zone signal SJ assumes "H" level, and is applied to the reset input terminal of RS-FF 23, this flipflop is reset, producing an output signal $S_4$ of an "L" level. Accordingly, the multivibrator 24 and its following oscillator 25 are not activated, and their output signals $S_5$, $S_6$ also assume an "L" level, preventing the element 26 from producing sound.

When a distance ring (not shown) of the camera is operated to move the focal point of the taking lens toward the in-focus zone, which is entered at time $t_1$, the in-focus zone signal SJ from the detector 2 changes from "H" to "L" level, whereby the diode 8 is also illuminated, thus providing a visible display that the in-focus zone is entered. While the in-focus zone signal SJ of an "L" level is applied to the reset input terminal of RS-FF 23, the output signal $S_4$ thereof remains at its "L" level, preventing the multivibrator 24 and subsequent circuit components from operating.

As the distance ring continues to be operated, and the focal point of the taking lens reaches the in-focus position at time $t_2$, both the forward and the backward focussing signal SF and SB reverse their levels. The forward focussing SF changes from "L" to "H" level, whereby the diode 6 ceases to be illuminated while the diode 7 becomes illuminated as a result of the backward focussing signal SB changing from its "H" to its "L" level, thus providing a visible display that the camera is now in a backward focussing condition. In other words, the point in time when the illumination switches between the diodes 6 and 7 represents the in-focus position. When the forward focussing signal SF changes to its "H" level, the transistor 11 is turned off at time $t_2$, allowing the capacitor 13 to be charged. The voltage across the capacitor 13 is supplied as the input signal $S_1$ to the gate 20, and increases with a time constant which depends on the resistance of resistor 12 and the capacitance of capacitor 13.

When the backward focussing signal SB changes to its "L" level at time $t_2$, the transistor 15 is turned on, whereby its collector assumes an "L" level, causing the capacitor 17 to discharge. Thus the input signal $S_2$ to the gate 20 assumes an "L" level. As a result, the gate 20 produces the signal $S_3$ of an "H" level for a time interval $T_a$ from the time $t_2$ until the input signal $S_1$ to the gate reaches a given "H" level. The output signal or the set signal $S_3$ from the gate 20 is applied to the set input terminal of RS-FF 23 to change the output signal $S_4$ therefrom from its "L" to its "H" level. This activates the multivibrator 24 so as to produce the signal $S_5$ of an "H" level for a given time interval $T_0$. Accordingly, the oscillator 25 produces an oscillation signal $S_6$ during the same time interval $T_0$ to activate the element 26 to produce sound. In this manner, there is provided an audible or acoustic indication that the camera is in its in-focus condition. The output signal $S_4$ of RS-FF 23 remains at its "H" level so long as the in-focus zone signal SJ assumes its "L" level, if the input signal $S_1$ to the gate 20 changes to its "H" level to have its output signal $S_3$ changed to its "L" level. Stated differently, if the distance ring is operated to move the focal point of the taking lens forwardly and rearwardly through the in-focus position or the camera itself is moved forwardly and rearwardly while maintaining the in-focus zone in which the zone signal SJ assumes its "L" level, the output signal $S_4$ remains unchanged from its "H" level. Thus, after the multivibrator 24 has delivered the signal $S_5$ of "H" level for the time interval $T_0$, the signal $S_5$ remains at its "L" level, preventing the element 26 from producing sound for the second time after it has once produced sound when the in-focus position is initially reached.

Figure 2:
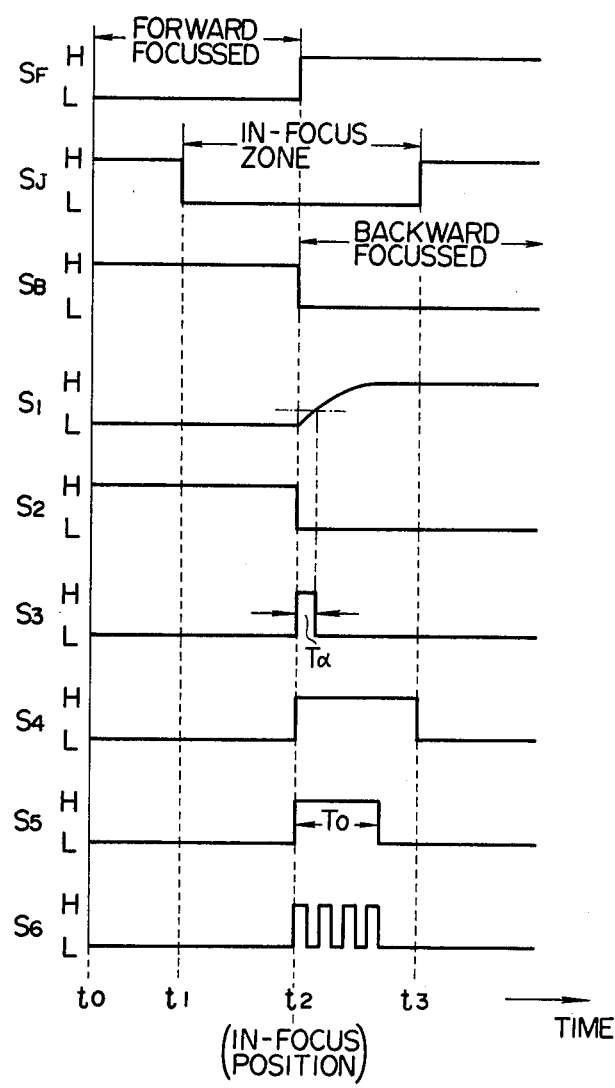
FIG. 2 is a series of timing charts illustrating various signals appearing in the indicator of FIG. 1.

If the distance ring is operated in a manner to move the focal point of the taking lens away from the in-focus position, for example, in a direction toward the backward focussing condition as illustrated in FIG. 2, the in-focus zone signal SJ assumes an "H" level as soon as the focal point moves out of the in-focus zone. At this time $t_3$, RS-FF 23 is reset, whereby the output signal $S_4$ therefrom assumes an "L" level. Hence, by moving the focal point of the taking lens to the in-focus position in a similar manner as mentioned above after RS-FF 23 is once reset, RS-FF 23 again produces the output signal $S_4$ of "H" level when the in-focus position is reached, allowing the multivibrator 24 and the oscillator 25 to operate as before, allowing the element 26 to produce sound.

It will be recognized that even though the element 26 produces sound when the focal point of the taking lens reaches the in-focus position, no sound is subsequently produced by the element if the in-focus position is reached again, as far as the focal point is located within the in-focus zone. It is only when the focal point once moves out of the in-focus zone (the flipflop being reset) and returns to the in-focus zone again that the element 26 produces sound again. In this manner, the number of times the element 26 produces sound can be minimized during a photographing operation.

Figure 3:
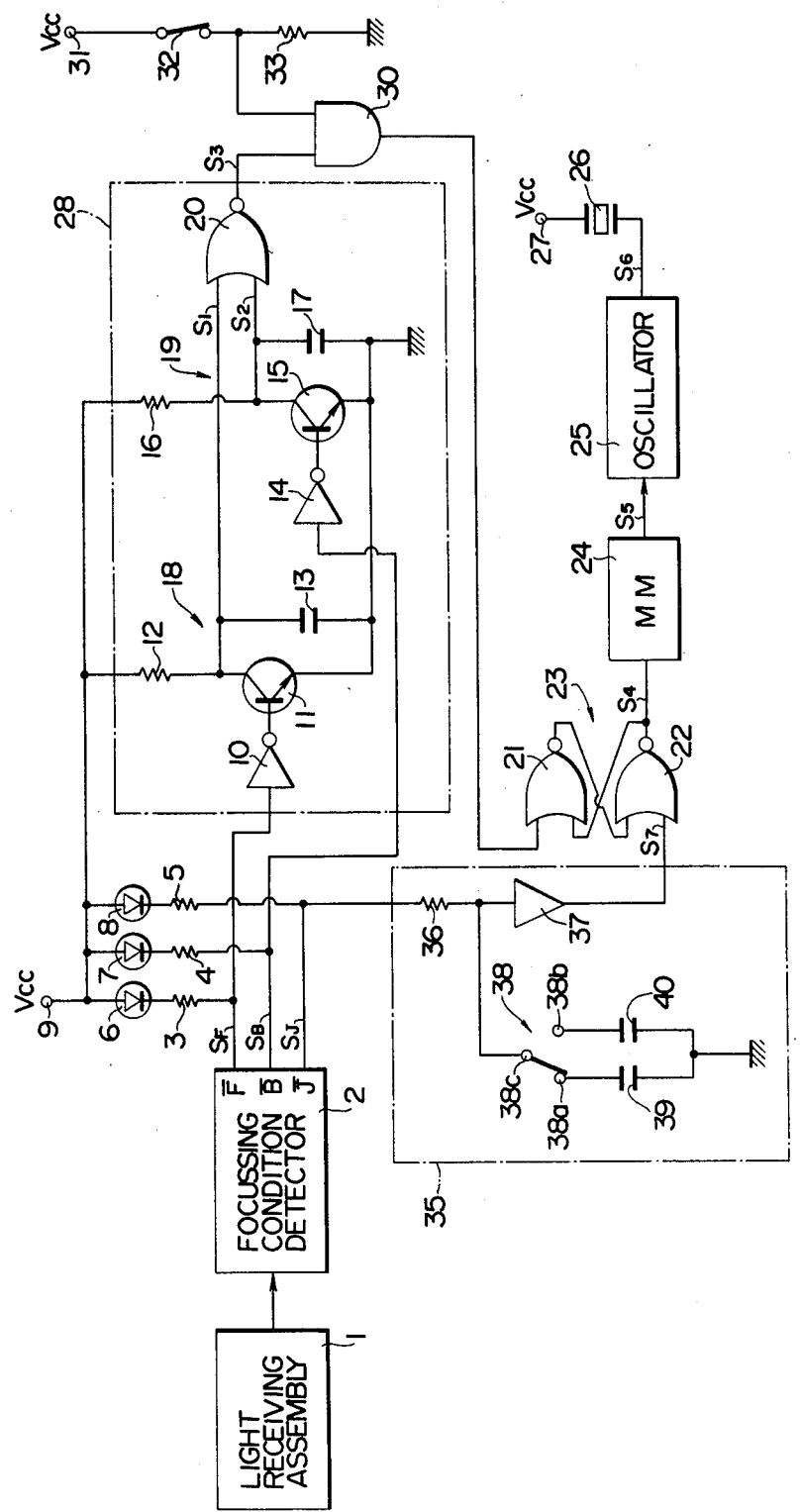
FIG. 3 is a circuit diagram of an in-focus indicator according to another embodiment of the invention.

FIG. 3 is a circuit diagram of an in-focus indicator according to another embodiment of the invention. Corresponding parts to those shown in FIG. 1 are designated by like reference numerals or characters without repeating their detailed description. As before, a set signal generator 28 includes NOR gate 20, the output of which is connected to one input terminal of AND gate 30, the other input terminal of which is connected to the junction between a mirror interlocked switch 32 and a resistor 33 which are connected in series across a terminal 31, to which a supply voltage Vcc is applied, and the ground. It is to be understood that the switch 32 changes from its closed to its open condition in interlocked relationship with the upward movement of a movable reflecting mirror used in a single lens reflex camera. The output terminal of gate 30 is connected to the set input terminal of RS-FF 23.

A focussing condition detector 2 includes an output terminal J, which is in turn connected to a timer circuit 35 which has its other end connected to the reset intput terminal of RS-FF 23. The purpose of the timer circuit 35 is to prevent RS-FF 23 from being frequently reset as a result of short term variations of an in-focus zone signal SJ. Specifically, the output terminal J is connected through a series combination of resistor 36 and buffer amplifier 37 to the reset input terminal of RS-FF 23, and the junction between the resistor 36 and buffer amplifier 37 is connected to the movable contact 38c of a changeover switch 38 having fixed contacts 38a, 38b, which are connected to one end of capacitors 39, 40, respectively, the other end of which is connected to the ground in common. The capacitors 39, 40 have different capacitances, and by throwing the movable contact 38c to either fixed contact 38a or 38b, a different time constant as defined by the combination of the resistor 36 and either capacitor 39 or 40 is established in the timer circuit 35. The remainder of the circuit arrangement is the same as shown in FIG. 1.

Figure 4:
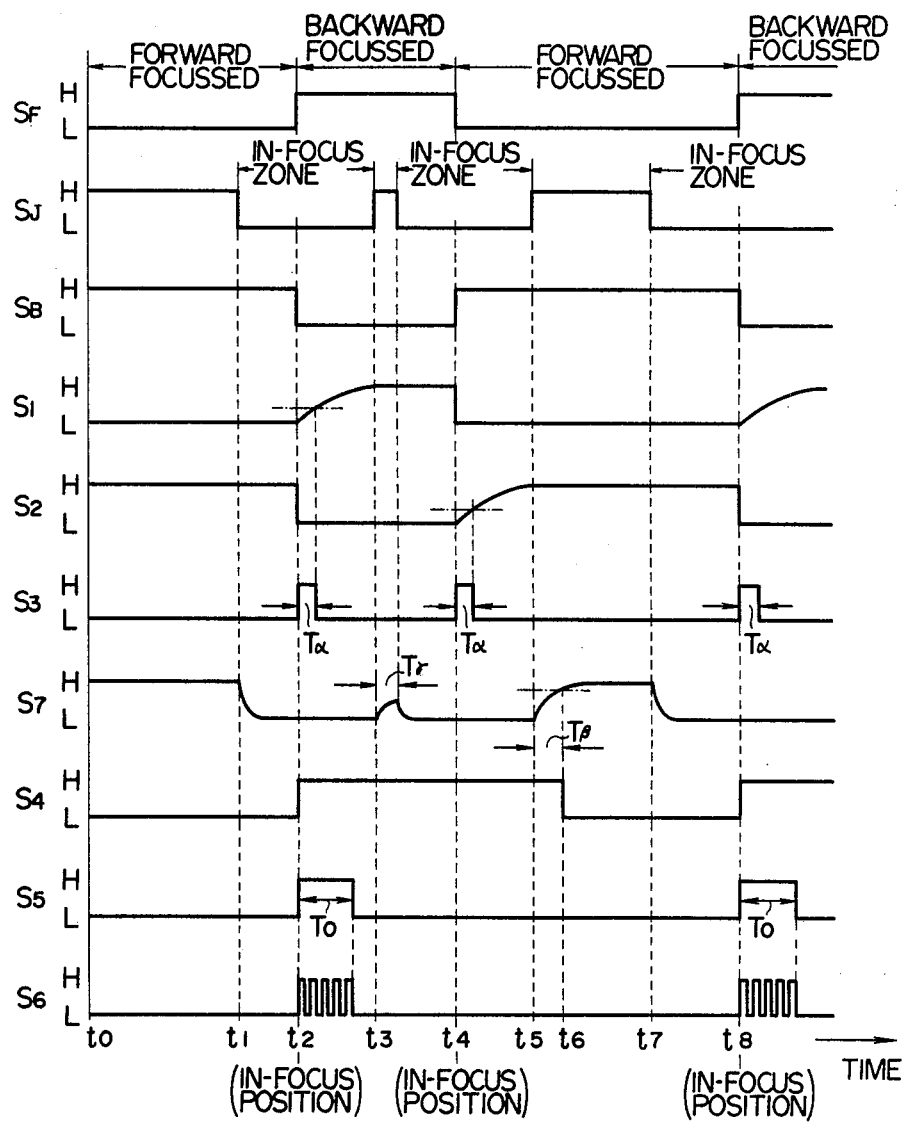
FIG. 4 is a series of timing charts illustrating various signals appearing in the indicator of FIG. 3.

The operation of the in-focus indicator shown in FIG. 3 sill be described below with reference to the timing charts shown in FIG. 4. As before, at time $t_0$ when the focal point of the taking lens is in its forwardly focussed condition which is outside the in-focus zone, the status signals SF, SB, SJ assume "L", "H" and "H" levels, respectively, as shown in FIG. 4, allowing only the light emitting diode 6 to be illuminated to indicate a forward focussing condition. The input signals $S_1$ and $S_2$ to the gate 20 assume "L" and "H" levels, respectively, and therefore it produces the output signal $S_3$ of "L" level. This causes AND gate 30 to produce an output signal of "L" level which is applied to the set input of RS-FF 23. Since the focal point is outside the in-focus zone, the in-focus zone signal SJ assumes an "H" level, and accordingly an output signal $S_7$ from the timer circuit 35 which is applied to the reset input terminal of RS-FF 23 assumes an "H" level. Thus the output signal from RS-FF 23 is at its "L" level, preventing the activation of the monostable multivibrator 24 and its following circuit.

Subsequently, when an operation of the distance ring brings the focal point of the taking lens into the in-focus zone at time $t_1$, the in-focus zone signal SJ assumes an "L" level, whereby the light emitting diode 8 is also illuminated, thus providing a visible display that the focal point is within the in-focus zone. This in-focus zone signal SJ causes the timer circuit 35 to produce the output signal $S_7$ of "L" level, but the output signal $S_4$ from RS-FF 23 remains unchanged from its "L" level.

When a subsequent operation of the distance ring brings the focal point of the taking lens into coincidence with the in-focus position at time $t_2$, the level of both the forward and the backward focussing signal FF and FB reverses, whereby the diode 6 is extinguished while the light emitting diode 7 is illuminated, providing a visible indication that the camera is in its backward focussing condition. The forward focussing signal SF which changes to its "H" level turns the transistor 11 off, allowing the capacitor 13 to begin charging. As a result, the input signal $S_1$ to the gate 20 increases with a time constant defined by the resistance of the resistor 12 and the capacitance of the capacitor 13. The backward focussing signal SB which changes to its "L" level turns the transistor 15 on, causing the capacitor 17 to discharge. Accordingly, the input signal $S_2$ to the gate 20 assumes its "L" level. Thus, the gate 20 produces the signal $S_3$ of "H" level for a time interval $T_\alpha$ from the time $t_2$ until the input signal $S_1$ to the gate reaches the given "H" level. This signal $S_3$ is fed through AND gate 30 to the set input terminal of RS-FF 23, which is then set to produce the output signal $S_4$ of "H" level, which causes the multivibrator 24 to produce the signal $S_5$ of "H" level for a given time interval $T_0$. In response thereto, the oscillator 25 produces an oscillation signal $S_6$ for the same time interval $T_0$, allowing the element 26 to produce sound for that time interval.

It will be seen that the described operation is similar to the operation of the first mentioned embodiment. As before, if the input signal $S_1$ to the gate 20 assumes an "H" level to have its output signal $S_3$ changed to "L" level, the output signal $S_7$ from the timer circuit 35 remains at its "L" level as long as the in-focus zone signal SJ assumes its "L" level, so that the output signal $S_4$ from RS-FF 23 remains at its "H" level. Accordingly, if the distance ring is operated or the camera is moved to cause the focal point of the taking lens to pass through the in-focus position again, the output signal $S_4$ is maintained at its "H" level and the output signal $S_5$ from the multivibrator 24 has returned to its "L" level, preventing the element 26 from producing sound another time, in the similar manner as mentioned previously.

If the distance ring is subsequently operated in a direction to move the focal point of the taking lens out of the in-focus zone or toward the backward focussing condition at time $t_3$, the in-focus zone signal SJ assumes its "H" level, whereby the timer circuit 35 initiates charging either capacitor 39 or 40 from time $t_3$ on, thus initiating a time counting operation. However, if the in-focus zone signal SJ remains at its "H" level for a brief interval which is less than a given time interval $T_\beta$, the in-focus zone signal SJ returns to its "L" level before either capacitor 39 or 40 is charged to a voltage corresponding to an "H" level. Accordingly, such capacitor 39 or 40 discharges. Hence, the output signal $S_7$ from the timer circuit 35 remains at its "L" level as it is applied to the reset input terminal of RS-FF 23 if the in-focus zone signal SJ assumes its "H" level for a brief interval, for example, an interval $T_\gamma(T_\gamma<T_{62})$, and hence RS-FF 23 continues to feed the output signal $S_4$ of "H" level to the multivibrator 24 without being reset.

Consequently, if the focal point of the taking lens subsequently moves from its backward focussing condition toward its forward focussing condition and reaches the in-focus position, the multivibrator 24 cannot be activated since the output signal $S_4$ from RS-FF 23 is maintained at its "H" level. Thus, the oscillator 25 is not activated, preventing the element 26 from producing sound.

If the focal point of the taking lens thereafter moves out of the in-focus zone, for example, toward the forward focussing condition as illustrated in FIG. 4, for a time interval exceeding the interval $T_\beta$ from the time $t_5$, the capacitor 39 or 40 is charged to a voltage which is sufficient to cause the output signal $S_7$ from the timer circuit 35 to assume its "H" level, and hence RS-FF 23 is reset at time $t_6$ which is an interval $T_\beta$ after the time $t_5$, changing its output signal $S_4$ to its "L" level. If the focal point then enters the in-focus zone to change the in-focus zone signal SJ to its "L" level at time $t_7$ and reaches the in-focus position at time $t_8$, the level of the forward focussing and the backward focussing signal SF and SB reverses, to cause the signal $S_3$ of "H" level to be delivered from the gate 20 for a time interval $T_\alpha$. Thus, the output signal $S_4$ from RS-FF 23 changes from its "L" to its "H" level, allowing the multivibrator 24 to produce the signal $S_5$ at its "H" level to activate the oscillator 25 to produce the oscillation signal $S_6$ for the time interval $T_0$, thus allowing the element 26 to produce sound. In this manner, the indicator notifies a photographer in an audible manner that the focal point of the taking lens has reached the in-focus position from a point outside the in-focus zone.

It will be seen that the in-focus indicator of FIG. 3 operates to allow the element 26 to produce sound when the focal point of the taking lens has moved from a point outside the in-focus zone, corresponding to a forward focussing or a backward focussing condition, into the in-focus position, in the same manner as does the indicator of FIG. 1. In addition, the indicator of FIG. 3 prevents the element 26 from producing sound if the focal point is out of the in-focus zone only for a brief interval, namely, when the focal point once moves out of the zone, but returns into the zone within the given time interval $T_\beta$. In this manner, an unnecessary operation of the element 26 to produce sound is further suppressed as compared with the arrangement of FIG. 1. Accordingly, this in-focus indicator is particularly effective for use with a camera which utilizes a lens of an increased focal length since a frequent generation of sound by the element 26 can be prevented in the event that the image of an object being photographed moves out of the light receiving element in response to any slight "shaking" of the camera, which is likely to occur when utilizing a lens of an increased focal length.

With the in-focus indicator of FIG. 3, the switch 32 is opened in interlocked relationship with the movement of the mirror upon shutter release, thereby assuring an "L" level output from the gate 30 to prevent the activation of the element 26 if the output signal $S_3$ from the gate 20 changes to its "H" level as a result of a changing optical image which is occasioned by the upward movement of the reflecting mirror. It is to be understood that the circuit which prevents a malfunctioning accompanying the upward movement of the reflecting mirror is also applicable to the in-focus indicator of FIG. 1.

What is claimed is:

1. An in-focus indicator for a camera, comprising:
    a focussing condition detector responsive to the optical image of an object being photographed which is projected onto a film surface, by producing at least three status signals including a forward focussing signal, a backward focussing signal and an in-focus zone signal;
    means for generating a set signal in response to a change in the focussing signals being produced;
    a set signal save circuit adapted to be set by the set signal from said generating means and reset by the interruption of the in-focus zone signal;
    an oscillator responsive to the set output from the set signal save circuit by being activated for a given time interval; and
    an element responsive to an output from the oscillator by producing sound only when an in-focus position is reached from either a forward focussing or a backward focussing condition which is outside the in-focus zone.

2. An in-focus indicator according to claim 1 in which the focussing condition detector includes a pair of output terminals where the forward focussing signal and the backward focussing signal are developed, and in which said generating means comprises a pair of pulse leading end delay circuits, each formed by a combination of a transistor and an RC time constant circuit, and an NOR gate having a pair of input terminals which are connected to the output terminal of the respective delay circuits.

3. An in-focus indicator according to claim 1 in which the set signal save circuit comprises an RS-flip-flop.

4. An in-focus indicator according to claim 1, further including a timer circuit connected between an output terminal of the detector at which the in-focus zone signal is developed and the reset input terminal of the set signal save circuit for delivering a reset signal to the reset input terminal of the save circuit when the in-focus zone signal is interrupted over a given time interval.

5. An in-focus indicator according to claim 4 in which the timer circuit comprises a resistor and a buffer amplifier connected across the output terminal of the detector at which the in-focus zone signal is developed and the reset input terminal of the set signal save circuit, with the junction between the resistor and buffer amplifier being connected through a changeover switch with a plurality of capacitors, each of which forms an RC time constant circuit together with the resistor.

6. An in-focus indicator according to claim 1 further including a switch connected between the output terminal of said generating means and the set input terminal of the set signal save circuit for interrupting the set signal in interlocked relationship with the upward movement of a movable reflecting mirror of the camera.

7. An in-focus indicator according to claim 1, in which said set signal is produced when the inner focus position is reached by a signal switching occuring between the forward focussing signal and the backward focussing signal from the focussing condition detector.

8. An in-focus indicator according to claim 1, in which said sound producing element indicates the in-focus position.

9. An in-focus indicator for a camera, comprising:
    a focussing condition detector for producing a plurality of signals including at least one out-of-focus signal and an in-focus zone signal which incorporates the in-focus position and extends to either side thereof, in response to the optical image of an object being photographed, said zone signal and said out-of-focus signal at least partially overlapping one another;
    means for generating a set signal in response to a change in the out-of-focus signal;
    circuit means for receiving said set signal for setting said circuit means and connected to said detector for receipt of said in-focus zone signal to reset said circuit means;

oscillator means activated by said set signal for a given time interval not greater than the set interval of said circuit means; and sound producing means responsive to an output from said oscillator means for producing sound only when an in-focus position of the camera is obtained after an out-of-focus condition.

10. The in-focus indicator of claim 9, wherein said detector generates two out-of-focus signals for indicating backward focussed and forward focussed conditions, respectively; said set signal generating means comprising first and second delay means for respectively delaying a change in one of the backward and forward focussed signals occurring during the focussing operation, the changing signal depending upon the direction of movement of the focussing condition between the backward and forward focussed condition; and gating means for generating said set signal responsive to said first and second delay means.

11. The in-focus indicator of claim 9 further comprising monostable multivibrator means responsive to the set state of said circuit means for controlling the interval during which said oscillator means is activated.

* * * * *